(12) United States Patent
Nair et al.

(10) Patent No.: US 12,205,035 B2
(45) Date of Patent: Jan. 21, 2025

(54) ARTIFICIAL NEURAL NETWORK TRAINING USING FLEXIBLE FLOATING POINT TENSORS

(71) Applicant: Intel Corporation, Santa Clara, CA (US)

(72) Inventors: Krishnakumar Nair, Santa Clara, CA (US); Andrew Yang, Cupertino, CA (US); Brian Morris, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 16/004,243

(22) Filed: Jun. 8, 2018

(65) Prior Publication Data

US 2019/0042944 A1   Feb. 7, 2019

(51) Int. Cl.
| | |
|---|---|
| *G06N 3/084* | (2023.01) |
| *G06F 9/30* | (2018.01) |
| *G06N 3/045* | (2023.01) |
| *G06N 3/063* | (2023.01) |

(52) U.S. Cl.
CPC ............ *G06N 3/084* (2013.01); *G06N 3/045* (2023.01); *G06N 3/063* (2013.01); *G06F 9/3013* (2013.01)

(58) Field of Classification Search
None
See application file for complete search history.

(56) References Cited

U.S. PATENT DOCUMENTS

| | | | |
|---|---|---|---|
| 10,768,936 B2 * | 9/2020 | Burger | ................ G06F 9/30047 |
| 2007/0299898 A1 | 12/2007 | Richey et al. | |
| 2009/0292750 A1 | 11/2009 | Reyzin et al. | |

(Continued)

FOREIGN PATENT DOCUMENTS

JP    63255735 A    10/1988

OTHER PUBLICATIONS

Yokoo, Hidetoshi. "Overflow/underflow-free floating-point number representations with self-delimiting variable-length exponent field." IEEE Computer Architecture Letters 41.08 (1992): 1033-1039. (Year: 1992).*

(Continued)

*Primary Examiner* — Abdullah Al Kawsar
*Assistant Examiner* — Asher H. Jablon
(74) *Attorney, Agent, or Firm* — Hanley, Flight & Zimmerman, LLC

(57) ABSTRACT

Thus, the present disclosure is directed to systems and methods for training neural networks using a tensor that includes a plurality of FP16 values and a plurality of bits that define an exponent shared by some or all of the FP16 values included in the tensor. The FP16 values may include IEEE 754 format 16-bit floating point values and the tensor may include a plurality of bits defining the shared exponent. The tensor may include a shared exponent and FP16 values that include a variable bit-length mantissa and a variable bit-length exponent that may be dynamically set by processor circuitry. The tensor may include a shared exponent and FP16 values that include a variable bit-length mantissa; a variable bit-length exponent that may be dynamically set by processor circuitry; and a shared exponent switch set by the processor circuitry to selectively combine the FP16 value exponent with the shared exponent.

25 Claims, 5 Drawing Sheets

(56) References Cited

U.S. PATENT DOCUMENTS

2018/0157465 A1 6/2018 Bittner et al.
2019/0325296 A1* 10/2019 Fowers ............... G06F 15/8053
2019/0340492 A1* 11/2019 Burger .................... G06N 3/08

OTHER PUBLICATIONS

Das, Dipankar, et al. "Mixed precision training of convolutional neural networks using integer operations." arXiv preprint arXiv: 1802.00930 (Feb. 2018). (Year: 2018).*

Yokoo, Hidetoshi. "Overflow/underflow-free floating-point No. representations with self-delimiting variable-length exponent field." IEEE Computer Architecture Letters 41.08 (1992): 1033-1039. (Year: 1992).*

Ide et al. "A 320-MFLOPS Cmos Floating-point Processing Unit for Superscalar Processors." IEEE Journal of Solid-State Circuits (vol. 28, Issue: 3, Mar. 1993). pp. 352-361 (Year: 1993).*

Nagaraju, Mamidi, and Geedimatla Shekar. "FPGA Based Quadruple Precision Floating Point Arithmetic for Scientific Computations." International Journal of Advanced Computer Research 2.3 (2012). pp. 7-12 (Year: 2012).*

Köster et al., "Flexpoint: An Adaptive Numerical Format for Efficient Training of Deep Neural Networks", 2017, NIPS 2017, 11 pages (Year: 2017).*

Micikevicius, Paulius, Mixed-Precision Training of Deep Neural Networks, Artificial Intelligence(https://devblogs.nvidia.com/category/artificial-intelligence/)., 2017, Oct. 11, pp. 7.

Japanese Patent Office, "Decision to Grant a Patent," issued in connection with Japanese Patent Application No. 2019-082718, dated Jul. 11, 2023, 5 pages. [English Translation Included].

Japanese Patent Office, "Notice of Reasons for Refusal," issued in connection with Japanese Application No. 2019-082718, issued on Mar. 22, 2023, 6 pages. (Machine translation included).

Ryuka et al., "Shifting Amendment & Unity of the Inventions," Ryuka, dated Oct. 27, 2021, 2 pages.

Narang et al., "Mixed Precision Training", Published as a conference paper at ICLR, Feb. 2018, 12 pages, retrieved from <https://arxiv.org/abs/1710.03740)> on Feb. 8, 2023.

* cited by examiner

ARTIFICIAL NEURAL NETWORK TRAINING USING FLEXIBLE FLOATING POINT TENSORS

TECHNICAL FIELD

The present disclosure relates to training of neural networks.

BACKGROUND

In simplest form, a neural network includes an input layer having a plurality of inputs, an output layer containing one or more outputs, and at least one hidden layer containing a plurality of neurons coupled to the input layer and the output layer. Each of the neurons included in the hidden layer may have any number of inputs and any number of outputs. Each of the neuron inputs and/or neuron outputs are weighted to influence the decision-making capabilities of the neural network. These weights are typically initially assigned and then updated based on information contained in training data sets provided during the training period for the neural network.

In supervised training, both input data (i.e., data at the input layer) and output data (i.e., data at the output layer) are provided to the neural network. The network processes the input data and compares the results with the output data. Errors may be propagated back through the network to adjust weights that control the network, improving network accuracy and/or speed. The training process occurs in epochs. Each epoch includes one forward propagation of data through the neural network and one backward propagation of data through the neural network. Training may require numerous epochs to generate reliable and predictable output within an acceptable threshold.

Deep learning (also known as deep structured learning or hierarchical learning) is part of a broader family of machine learning methods based on learning data representations, as opposed to task-specific algorithms. Deep learning models are loosely related to information processing and communication patterns in a biological nervous system, such as neural coding that attempts to define a relationship between various stimuli and associated neuronal responses in the brain. Deep learning is computationally intensive, requiring significant processing capabilities and resources.

IEEE number formats include 16 bit floating point [FP16] and 32 bit floating point [FP32]. The IEEE 754 standard for FP16 includes a single sign bit, a 10 bit fraction, and a 5 bit exponent. The IEEE 754 standard for FP32 includes a single sign bit, a 23 bit fraction, and an 8 bit exponent. The use of FP32 in neural network training significantly increases the system computational load, particularly when compared to FP16. However, gradients in deep neural network training may become too shallow (i.e., fall below $2^{-24}$) and become "0" in FP16. Thus, despite the cost in computational overhead and time, much deep learning is performed in FP32.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
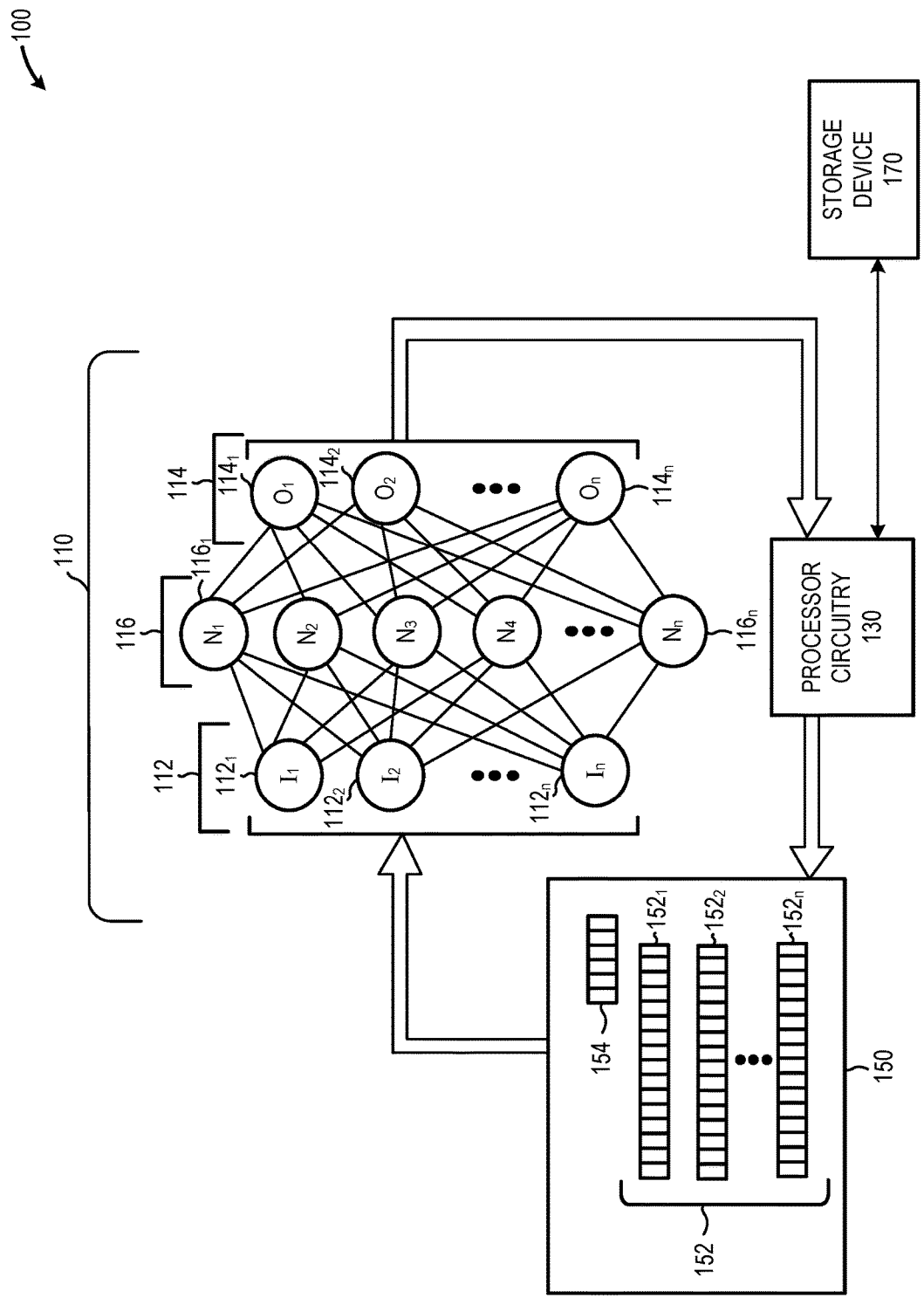
FIG. 1 provides a high level block diagram of an illustrative system that includes a neural network, processor circuitry to provide a training tensor to the neural network, and a storage device to store instructions executed by the processor circuitry, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods described herein provide systems and methods for enhancing the speed and accuracy of deep learning on neural networks using a neural network training tensor that includes 16-bit floating point (FP16) numbers that share a common exponent. One potential variation includes a neural network training tensor in which each floating point number is represented in a non-IEEE standard format that includes a variable length fraction portion and a variable length exponent portion. Another potential variation includes a neural network training tensor in which each floating point number includes a single ON/OFF bit used to either (a) combine the exponent of the respective floating-point number with the shared exponent;

or (b) do not combine the respective floating point exponent with the shared exponent (i.e., use only the floating point exponent). Thus the systems and methods described herein provide the advantage of FP16 computation while beneficially increasing the range of possible test values through the use of a five-bit shared exponent.

Some of the systems and methods described herein generate a neural network training tensor that includes a 6-bit shared exponent that is shared by each of a plurality of IEEE 754 compliant FP16 format numbers, each of which includes a single sign bit; a five-bit exponent; and, a 10-bit mantissa. Some of the systems and methods described herein generate a neural network training tensor that includes an exponent shared by each of a plurality of IEEE 754 non-compliant FP16 format numbers, each of which includes a single sign bit; an 8-bit exponent, and a 7-bit mantissa. Some of the systems and methods described herein generate a neural network training tensor including a plurality of FP16 numbers and a 6-bit shared exponent that is shared by all of the FP16 numbers included in the tensor. Each of the FP16 numbers may have a single sign bit, a single shared exponent ON/OFF switch, an 8-bit exponent, and a 6-bit mantissa. Some of the systems and methods described herein allow processor circuitry to adjust the value of the shared exponent to avoid potential overflow or underflow conditions. Some of the systems and methods described herein allow the processor circuitry to additionally or alternatively selectively adjust the value of the exponent and mantissa of some or all of the FP16 numbers included in the tensor to avoid potential overflow or underflow conditions. Thus, to avoid a potential overflow or underflow condition, the processor circuitry may beneficially and advantageously adjust, contemporaneous with training the neural network, some or all of: the value of the shared exponent, the value of the exponent in some or all of the FP16 numbers in the tensor, and/or the value of the mantissa in some or all of the FP16 numbers in the tensor.

A system for training a neural network is provided. The system may include: processor circuitry; and a storage device coupled to the processor circuitry, the storage device including machine readable instructions. The machine-readable instructions cause the processor circuitry to: generate a neural network training tensor that includes: a plurality of 16-bit floating point values, each of the plurality of 16-bit floating point values including: a first plurality of bits that form a mantissa of the respective floating point number; and a second plurality of bits that form an exponent of the respective floating point number; and a 6-bit shared exponent common to and shared by each of the 16-bit floating point values included in the training tensor.

A neural network training method is provided. The neural network training method may include: generating, by processor circuitry, a neural network training tensor that includes: a plurality of 16-bit floating point values, each of the 16-bit floating point values including: a first plurality of bits that form a mantissa of the respective floating point number; and a second plurality of bits that form an exponent of the respective floating point number; and a 6-bit shared exponent common to each of the 16-bit floating point values included in the training tensor; and providing as an input to the neural network at least one of the plurality of 16-bit floating point values included in the training tensor.

A neural network training system is provided. The training system may include: means for generating, by processor circuitry, a neural network training tensor that includes: a plurality of 16-bit floating point values, each of the 16-bit floating point values including: a first plurality of bits that form a mantissa of the respective floating point number; and a second plurality of bits that form an exponent of the respective floating point number; and a 6-bit shared exponent common to each of the 16-bit floating point values included in the training tensor; and means for providing as an input to the neural network at least one of the plurality of 16-bit floating point values included in the training tensor.

A non-transitory, machine-readable, storage medium is provided. The non-transitory machine-readable storage medium includes machine readable instructions that, when executed by processor circuitry, cause the processor circuitry to: generate a neural network training tensor that includes: a plurality of 16-bit floating point values, each of the plurality of 16-bit floating point values including: a first plurality of bits that form a mantissa of the respective floating point number; and a second plurality of bits that form an exponent of the respective floating point number; and a 6-bit shared exponent common to each of the 16-bit floating point values included in the training tensor.

A processor-based device for training a neural network is provided. The processor-based device may include: a printed circuit board; processor circuitry coupled to the printed circuit board; an input/output interface couplable to a neural network; and a storage device coupled to the processor circuitry, the storage device including machine readable instructions that, when executed by the processor circuitry, cause the processor circuitry to: generate a neural network training tensor that includes: a plurality of 16-bit floating point values, each of the plurality of 16-bit floating point values including: a first plurality of bits that form a mantissa of the respective floating point number; and a second plurality of bits that form an exponent of the respective floating point number; and a 6-bit shared exponent common to each of the 16-bit floating point values included in the training tensor.

FIG. 1 provides a high level block diagram of an illustrative system 100 that includes a neural network 110, processor circuitry 130 to provide a training tensor 150 to the neural network 110, and a storage device 170 to store instructions executed by the processor circuitry 130, in accordance with at least one embodiment described herein. The training tensor 150 includes a plurality of 16-bit floating point values $152_1$-$152_n$ (collectively, "16-bit floating point values 152") and an exponent 154 that is common to and shared by each of at least some of the 16-bit floating point values 152. In embodiments, the processor circuitry 130 generates or causes the generation of the training tensor 150 used to train (e.g., set the weighting and/or biasing of) the neural network 110. In embodiments, execution of instructions stored in, on, or about the storage device 170 may cause the processor circuitry 130 to forward propagate and/or backwards propagate the training tensor 150 through the neural network 110.

The neural network 110 includes a plurality of inputs $112_1$-$112_n$ (collectively, "inputs 112") and a plurality of outputs $114_1$-$114_n$ (collectively, "outputs 114") that care coupled by a hidden layer 116 that includes a plurality of neurons $116_1$-$116_n$ (collectively, "neurons 116"). Although the hidden layer 116 includes only a single layer of neutrons, those of ordinary skill in the relevant arts will readily appreciate the hidden layer 116 may include any number of layers. In embodiments, the neural network 110 may include a neural network capable of deep learning, a deep neural network.

The processor circuitry 130 may include any number and/or combination of currently available and/or future developed electrical components, semiconductor devices, and/or logic elements capable of providing the 16-bit floating point values 152 and 6-bit shared exponent 154 included in the training tensor 150 to the neural network 110. In some implementations, the processor circuitry 130 may dynamically adjust the exponent 154 based on one or more parameters associated with the neural network 110 and/or the training tensor 150. For example, the processor circuitry 130 may execute instructions that cause an increase in the shared exponent 154 in response to detecting a potential overflow of one or more 16-bit floating point values 152 included in the training tensor 150. In another example, the processor circuitry 130 may execute instructions that cause a decrease in the shared exponent 154 in response to detecting a potential underflow of one or more 16-bit floating point values 152 included in the training tensor 150.

In embodiments, the processor circuitry 130 may include circuitry to calculate or otherwise determine a rate of increase or a rate of decrease of one or more 16-bit floating point values 152 included in the training tensor 150 to identify those 16-bit floating point values 152 demonstrating behavior indicative of a potential underflow or overflow condition. In other embodiments, the processor circuitry 130 may include circuitry to calculate or otherwise determine an incremental increase or decrease of one or more 16-bit floating point values 152 included in the training tensor 150 to identify those 16-bit floating point values 152 demonstrating behavior indicative of a potential underflow or overflow condition.

In embodiments, the processor circuitry 130 may forward propagate some or all of the 16-bit floating point values 152 included in the training tensor 150 through the neural network 110. In embodiments, the processor circuitry 130 may backward or reverse propagate some or all of the 16-bit floating point values 152 included in the training tensor 150 through the neural network 110. In embodiments, the processor circuitry 130 may include one or more general purpose systems and/or devices configured to generate the 16-bit floating point values 152 included in the training tensor 150 and/or provide the 16-bit floating point values 152 included in the training tensor 150 to the neural network 110. In embodiments, the processor circuitry 130 may receive at least a portion of the 16-bit floating point values 152 included in the training tensor 150 from one or more external sources, such as a network connected source.

The training tensor 150 includes a plurality of 16-bit floating point values 152. The training tensor 150 also includes a shared exponent 154 that may be shared by each of at least a portion of the 16-bit floating point values 152. The shared exponent 154 may include a sign bit to provide a signed shared exponent 154. The shared exponent 154 may include a 3-bit value; a 4-bit value; a 5-bit value; a 6-bit value; a 7-bit value; or an 8-bit value. For example, using an IEEE 754 standard 16-bit floating point format, each 16-bit floating point value 152 included in the training tensor 150 would include: a single sign bit; a 10-bit mantissa; and an exponent that includes the sum of the 5-bit exponent included in the 16-bit floating point value 152 PLUS the 5-bit shared exponent 154. In embodiments, the training tensor 150 includes a plurality of IEEE 754 compliant half-precision (16-bit floating point) values 152. In embodiments, the training tensor 150 includes a plurality of IEEE 754 non-compliant half-precision (16-bit floating point) values 152.

The storage device 170 may include any number and/or combination of currently available and/or future developed data storage systems and/or devices. In embodiments, the storage device 170 may store machine readable instruction sets executable by the processor circuitry 130. In embodiments, the storage device 170 may hold, store, or otherwise retain in one or more data stores, data structures, and/or databases at least some of the 16-bit floating point values 152 that form the training tensor 150.

Figure 2:
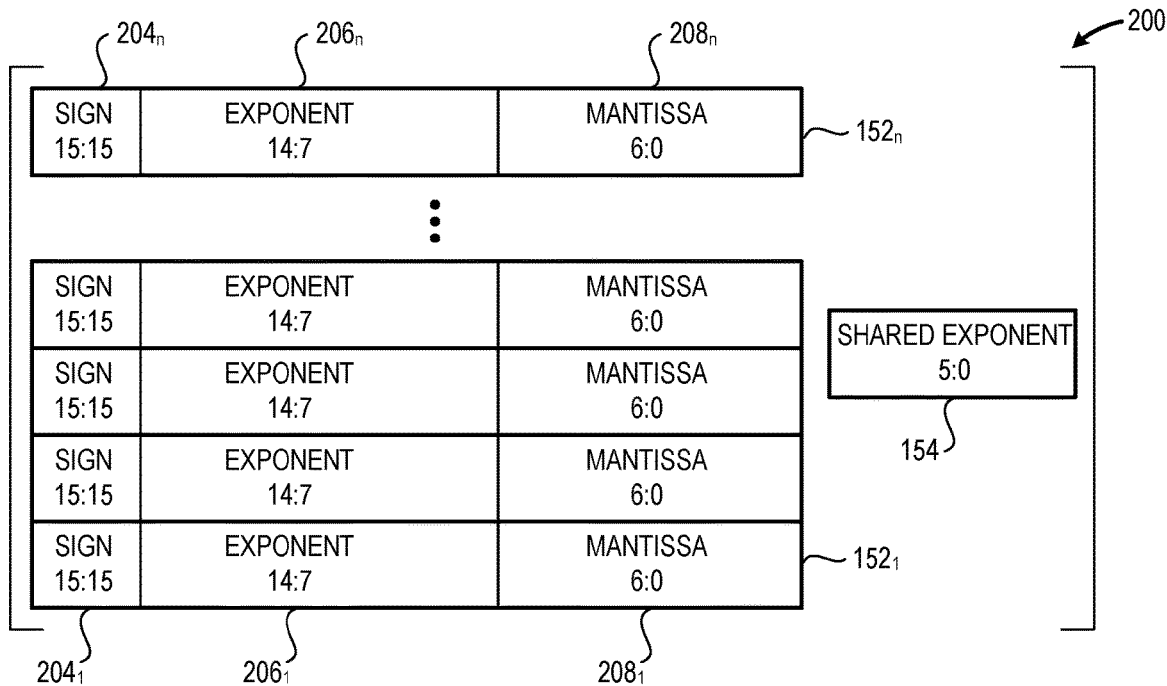
FIG. 2 is an illustrative tensor that includes a plurality of 16-bit floating point numbers sharing a common 6-bit exponent (5:0) and in which each of the 16-bit floating point numbers in the tensor includes a single sign bit (15:15); an 8-bit exponent (14:7) and a 7-bit mantissa (6:0), in accordance with at least one embodiment described herein.

FIG. 2 is an illustrative tensor 200 that includes a plurality of 16-bit floating point (FP16) numbers $152_1$-$152_n$, each of which shares a common 6-bit exponent (5:0) 154 and in which each of the FP16 numbers includes: a respective single sign bit (15:15) $204_1$-$204_n$; a respective 8-bit exponent (14:7) $206_1$-$206_n$; and a respective 7-bit mantissa (6:0) $208_1$-$208_n$, in accordance with at least one embodiment described herein. The ability to dynamically alter one or more of: the value of the shared exponent 154; the mantissa value of one or more FP16 numbers; and the exponent value of one or more FP16 number included in the training tensor 200 beneficially permits the processor circuitry 130 to proactively adjust one or more FP16 values in the tensor 200 to avoid potential overflow or underflow conditions during the neural network training process. Using the format depicted in FIG. 2, each 16-bit floating point value 152 may be represented as:

$$(-1)^{S}*(1 \cdot M \ldots 0)_2 * 2^{(E \ldots 0)_2 - \text{Exponent Bias} + \text{Signed Shared Exponent}} \quad (1)$$

Where the exponent bias is given by:

$$(2)^{(E-M)} - 1 \quad (2)$$

Figure 3:
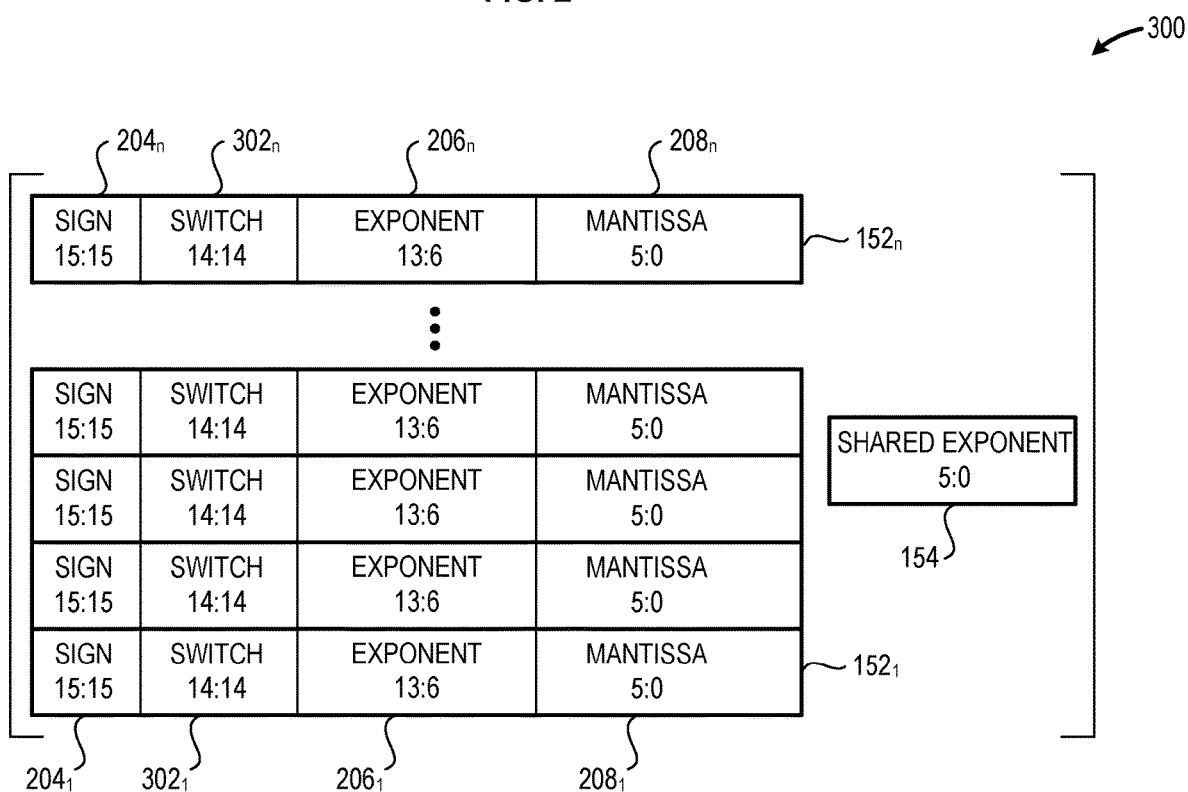
FIG. 3 is another illustrative tensor that includes a plurality of 16-bit floating point numbers sharing a common 6-bit exponent (5:0) and in which each of the 16-bit floating point numbers in the tensor includes a single sign bit (15:15); a single exponent ON/OFF switch bit (14:14); an 8-bit exponent (13:6); and a 6-bit mantissa (5:0), in accordance with at least one embodiment described herein.

FIG. 3 is another illustrative tensor 300 that includes a plurality of 16-bit floating point (FP16) numbers 152 1-152 n sharing a common 6-bit exponent (5:0) 154 and in which each of the FP16 numbers includes: a respective single sign bit (15:15) 204 1-204 n; a respective shared exponent ON/OFF switch bit (14:14) 302 1-302 n; a respective 8-bit exponent (14:7) 206 1-206 n; and a respective 6-bit mantissa (5:0) 208 1-208 n, in accordance with at least one embodiment described herein. The ability to dynamically alter one or more of: the value of the shared exponent 154; the mantissa value of one or more FP16 numbers; and the exponent value of one or more FP16 number included in the training tensor 300 beneficially permits the processor circuitry 130 to proactively adjust one or more FP16 values in the tensor 300 to avoid potential overflow or underflow conditions during the neural network training process. In addition, the processor circuitry 130 may selectively designate whether the exponent 206 for each of the FP16 numbers 152 included in the training tensor 300 should be combined with the shared exponent—further increasing the flexibility of the training tensor 300. Using the format depicted in FIG. 3, with the shared exponent switch 304 in the "ON" logical state, a 16-bit floating point value 152 may be represented as:

$$(-1)S*(1 \cdot M \ldots 0)2*2(E \ldots 0)_2 - \text{Exponent Bias} + \text{Signed Shared Exponent} \quad (3)$$

Where the exponent bias is given by:

$$(2)^{(E-M)} - 1 \quad (4)$$

Using the format depicted in FIG. 3, with the shared exponent switch 304 in the "OFF" logical state, a 16-bit floating point value 152 may be represented as:

$$(-1)^{S}*(1 \cdot M \ldots 0)_2 * 2^{(E \ldots 0)_2 - \text{Exponent Bias}} \quad (5)$$

Where the exponent bias is given by:

$$(2)^{(E-M)} - 1 \quad (6)$$

Figure 4:
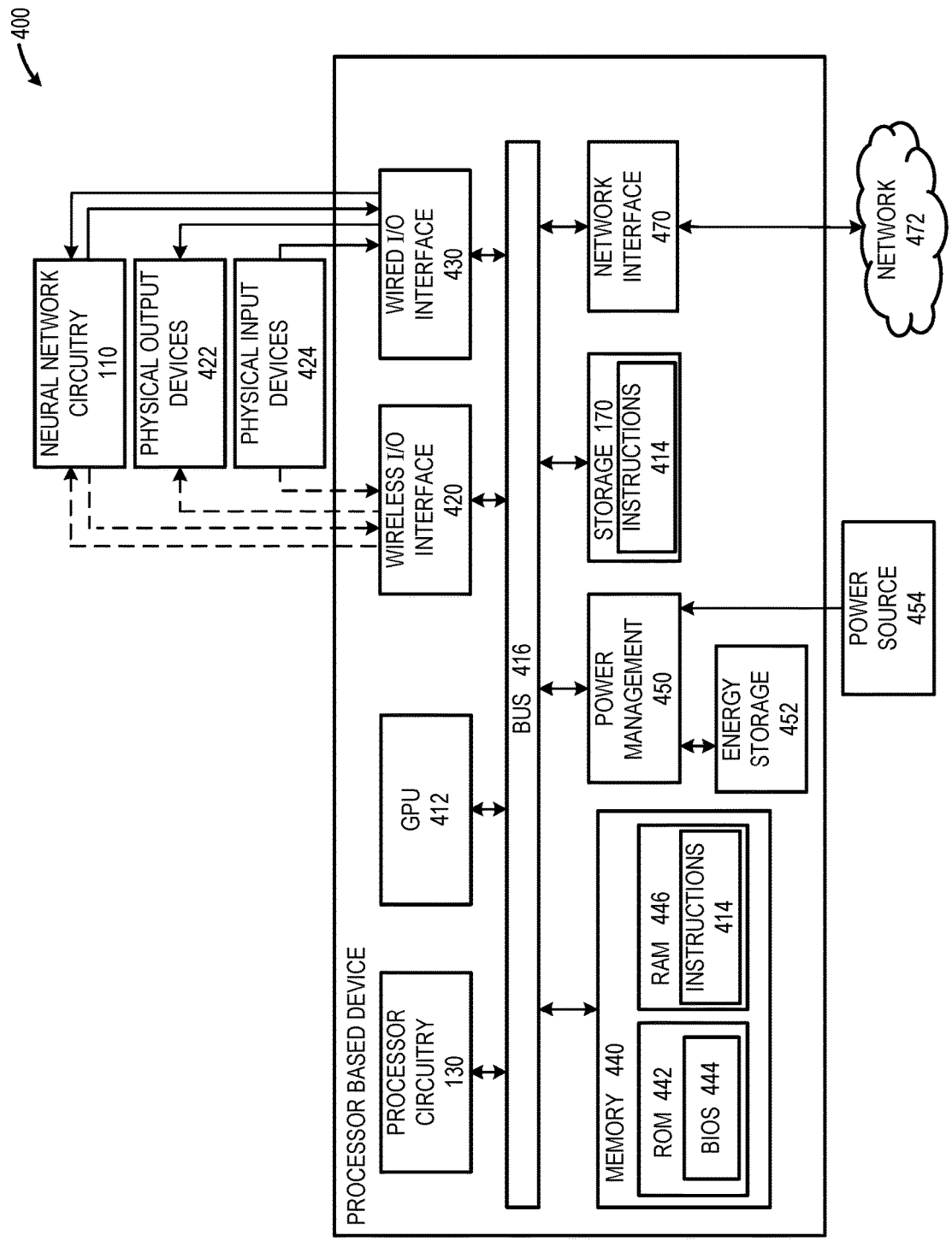
FIG. 4 is a schematic diagram of an illustrative electronic, processor-based, device that includes processor circuitry used to train a neural network coupled to the processor-based device using a training tensor that includes a plurality of 16-bit floating point values as described in FIGS. 1, 2, and 3, in accordance with at least one embodiment described herein.

FIG. 4 is a schematic diagram of an illustrative electronic, processor-based, device 400 that includes processor circuitry 130 used to train a neural network 110 coupled to the processor-based device 400 using a training tensor 150 that includes a plurality of 16-bit floating point values 152 as described in FIGS. 1, 2, and 3, in accordance with at least one embodiment described herein. The processor-based device 400 may additionally include one or more of the following: a graphical processing unit 412, a wireless input/output (I/O) interface 420, a wired I/O interface 430, memory circuitry 440, power management circuitry 450, the non-transitory storage device 170, and a network interface 470. The following discussion provides a brief, general description of the components forming the illustrative processor-based device 400. Example, non-limiting processor-based devices 400 may include, but are not limited to: smartphones, wearable computers, portable computing devices, handheld computing devices, desktop computing devices, blade server devices, workstations, and similar.

The processor-based device 400 includes processor circuitry 130 capable of creating or otherwise generating the 16-bit floating point values 152 included in the tensor 150 used to train the neural network 110. In embodiments, the processor-based device 400 may additionally include graphics processor circuitry 412. In embodiments, the processor-based device 400 includes processor circuitry 130 capable of executing one or more machine-readable instruction sets 414, reading data and/or instruction sets 414 from one or more storage devices 170 and writing data to the one or more storage devices 170. The processor circuitry 130 may forward propagate some or all of the 16-bit floating point values 152 included in the training tensor 150 through the neural network 110. The processor circuitry 130 may reverse propagate some or all of the 16-bit floating point values 152 included in the training tensor 150 through the neural network 110. In embodiments, the processor circuitry 130 may include predictive and/or detection circuitry to predict and/or detect information and/or data indicative of a potential overflow or underflow condition in one or more of the 16-bit floating point values 152 included in the training tensor 150.

In some embodiments, the processor-based device 400 includes graphics processor circuitry 412 capable of executing machine-readable instruction sets 414 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 130 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 400 includes a bus or similar communications link 416 that communicably couples and facilitates the exchange of information and/or data between various system components including the processor circuitry 130, the graphics processor circuitry 412, one or more wireless I/O interfaces 420, one or more wired I/O interfaces 430, one or more storage devices 170, and/or one or more network interfaces 470. The one or more network interfaces 470 communicate with network 472. The processor-based device 400 may be referred to in the singular herein, but this is not intended to limit the embodiments to a single processor-based device 400, since in certain embodiments, there may be more than one processor-based device 400 that incorporates, includes, or contains any number of communicably coupled, collocated, or remote networked circuits or devices.

The processor circuitry 130 may include any number, type, or combination of currently available or future developed devices capable of executing machine-readable instruction sets. The processor circuitry 130 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 4 are of conventional design. Consequently, such blocks need not be described in further detail herein, as they will be understood by those skilled in the relevant art. The bus 416 that interconnects at least some of the components of the processor-based device 400 may employ any currently available or future developed serial or parallel bus structures or architectures.

The system memory 440 may include read-only memory ("ROM") 442 and random access memory ("RAM") 446. A portion of the ROM 442 may be used to store or otherwise retain a basic input/output system ("BIOS") 444. The BIOS 444 provides basic functionality to the processor-based device 400, for example by causing the processor circuitry 130 to load and/or execute one or more machine-readable instruction sets 414. In embodiments, at least some of the one or more machine-readable instruction sets 414 cause at least a portion of the processor circuitry 130 to provide, create, produce, transition, and/or function as a dedicated, specific, and particular machine, for example a word processing machine, a digital image acquisition machine, a media playing machine, a gaming system, a communications device, a smartphone, or similar.

The processor-based device 400 may include at least one wireless input/output (I/O) interface 420. The at least one wireless I/O interface 420 may be communicably coupled to one or more physical output devices 422 (tactile devices, video displays, audio output devices, hardcopy output devices, etc.). The at least one wireless I/O interface 420 may communicably couple to one or more physical input devices 424 (pointing devices, touchscreens, keyboards, tactile devices, etc.). The at least one wireless I/O interface 420 may include any currently available or future developed wireless I/O interface. Example wireless I/O interfaces include, but are not limited to: BLUETOOTH®, near field communication (NFC), and similar.

The processor-based device 400 may include one or more wired input/output (I/O) interfaces 430. The at least one wired I/O interface 430 may be communicably coupled to one or more physical output devices 422 (tactile devices, video displays, audio output devices, hardcopy output devices, etc.). The at least one wired I/O interface 430 may be communicably coupled to one or more physical input devices 424 (pointing devices, touchscreens, keyboards, tactile devices, etc.). The wired I/O interface 430 may include any currently available or future developed I/O interface. Example wired I/O interfaces include, but are not limited to: universal serial bus (USB), IEEE 1394 ("FireWire"), and similar.

The processor-based device 400 may include one or more communicably coupled, non-transitory, data storage devices 170. The data storage devices 170 may include one or more hard disk drives (HDDs) and/or one or more solid-state storage devices (SSDs). The one or more data storage devices 170 may include any current or future developed storage appliances, network storage devices, and/or systems. Non-limiting examples of such data storage devices 170 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 170 may include one or more removable storage devices, such as one or more flash drives, flash memories, flash storage units, or similar appliances or devices capable of communicable coupling to and decoupling from the processor-based device 400.

The one or more data storage devices 170 may include interfaces or controllers (not shown) communicatively coupling the respective storage device or system to the bus 416. The one or more data storage devices 170 may store, retain, or otherwise contain machine-readable instruction sets, data structures, program modules, data stores, databases, logical structures, and/or other data useful to the processor circuitry 130 and/or graphics processor circuitry 412 and/or one or more applications executed on or by the processor circuitry 130 and/or graphics processor circuitry 412. In some instances, one or more data storage devices 170 may be communicably coupled to the processor circuitry 130, for example via the bus 416 or via one or more wired communications interfaces 430 (e.g., Universal Serial Bus or USB); one or more wireless communications interfaces 420 (e.g., Bluetooth®, Near Field Communication or NFC); and/or one or more network interfaces 470 (IEEE 802.3 or Ethernet, IEEE 802.11, or WiFi®, etc.).

Processor-readable instruction sets 414 and other programs, applications, logic sets, and/or modules may be stored in whole or in part in the system memory 440. Such instruction sets 414 may be transferred, in whole or in part, from the one or more data storage devices 170. The instruction sets 414 may be loaded, stored, or otherwise retained in system memory 440, in whole or in part, during execution by the processor circuitry 130 and/or graphics processor circuitry 412. The processor-readable instruction sets 414 may include machine-readable and/or processor-readable code, instructions, or similar logic capable of causing the processor circuitry 130 to dynamically adjust one or more of: the value of the shared exponent 154; the mantissa value of one or more FP16 numbers 208; and the exponent value of one or more FP16 numbers 206 included in the training tensor 150. The processor-readable instruction sets 414 may include machine-readable and/or processor-readable code, instructions, or similar logic capable of causing the processor circuitry 130 to selectively and individually set the shared exponent ON/OFF switch $302_1$-$302n$ for each FP 16 number $152_1$-$152_n$ to a first logical state ("ON") in which the shared exponent 154 is selectively combined with the exponent $206_1$-$206_n$ of the respective FP16 number $152_1$-$152_n$. The processor-readable instruction sets 414 may include machine-readable and/or processor-readable code, instructions, or similar logic capable of causing the processor circuitry 130 to selectively and individually set the shared exponent ON/OFF switch $302_1$-$302_n$ for each FP 16 number $152_1$-$152_n$ to a second logical state ("OFF") in which the shared exponent 154 is not combined with the exponent $206_1$-$206_n$ of the respective FP16 number $152_1$-$152_n$.

The processor-based device 400 may include power management circuitry 450 that controls one or more operational aspects of the energy storage device 452. In embodiments, the energy storage device 452 may include one or more primary (i.e., non-rechargeable) or secondary (i.e., rechargeable) batteries or similar energy storage devices. In embodiments, the energy storage device 452 may include one or more supercapacitors or ultracapacitors. In embodiments, the power management circuitry 450 may alter, adjust, or control the flow of energy from an external power source 454 to the energy storage device 452 and/or to the processor-based device 400. The power source 454 may include, but is not limited to, a solar power system, a commercial electric grid, a portable generator, an external energy storage device, or any combination thereof.

For convenience, the processor circuitry 130, the graphics processor circuitry 412, the wireless I/O interface 420, the wired I/O interface 430, the power management circuitry 450, the storage device 460, and the network interface 470 are illustrated as communicatively coupled to each other via the bus 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In another example, one or more of the above-described components may be integrated into the processor circuitry 130 and/or the graphics processor circuitry 412. In some embodiments, all or a portion of the bus 416 may be omitted and the components are coupled directly to each other using suitable wired or wireless connections.

Figure 5:
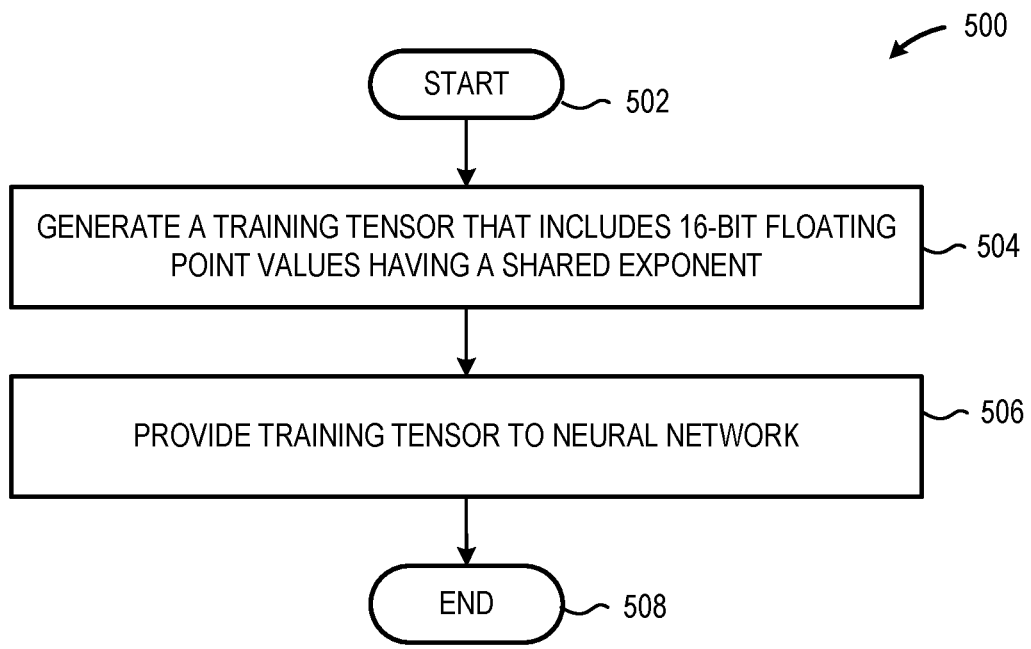
FIG. 5 is a high-level flow diagram of an illustrative method of training a neural network using a training tensor that includes a plurality of 16-bit floating point values having a common, shared, exponent, in accordance with at least one embodiment described herein.

FIG. 5 is a high-level flow diagram of an illustrative method 500 of training a neural network 110 using a training tensor 150 that includes a plurality of 16-bit floating point values 152 having a common, shared, exponent 154, in accordance with at least one embodiment described herein. The shared exponent 154 beneficially increases the range of possible values in the training tensor 150, thereby reducing the likelihood of an overflow or underflow condition in the training tensor 150. The method 500 commences at 502.

At 504, the processor circuitry 130 generates a training tensor 150 that includes a plurality of 16-bit floating point values 152. The exponent of each of at least a portion of the 16-bit floating point values 152 may be combined with a shared exponent 154 associated with the training tensor 150 to provide 16-bit floating point values 152 having an expanded range over IEEE 754 compliant 16-bit floating point values.

At 506, the processor circuitry 130 provides at least a portion of the training tensor 150 to the neural network 110. In embodiments, the processor circuitry 130 forward propagates the 16-bit floating point values 152 to the neural network 110. In embodiments, the neural network receives output from the neural network 110 and back-propagates at least a portion of the received 16-bit floating point values 152 through the neural network. The method 500 concludes at 508.

Figure 6:
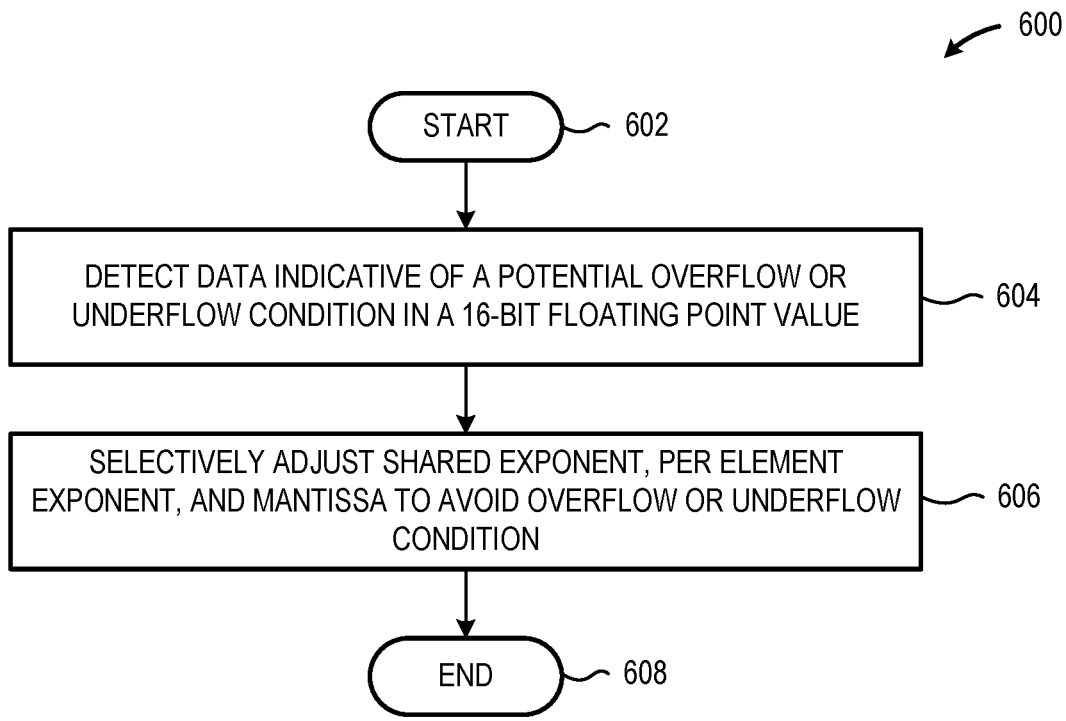
FIG. 6 is a high-level flow diagram of an illustrative method of generating 16-bit floating point values having a variable bit-length mantissa; a variable bit-length exponent; and a shared exponent, in accordance with at least one embodiment described herein.

FIG. 6 is a high-level flow diagram of an illustrative method 600 of selectively adjusting the value of one or more of the shared exponent 154, one or more FP16 mantissa values $208_1$-$208_n$, and one or more FP16 exponent values $206_1$-$206_n$, responsive to detecting data indicative of a potential overflow or underflow condition, in accordance with at least one embodiment described herein. The method 600 commences at 602.

At 604, the processor circuitry 130 detects data indicative of a potential overflow or underflow condition in one or more of the 16-bit floating point values 152 included in the training tensor 150. In embodiments, the processor circuitry 130 may include predictive circuitry and/or comparator circuitry capable of predicting a 16-bit floating point value 152 during future training epochs.

At 606, responsive to a determination that one or more of the 16-bit floating point values 152 will overflow or underflow during a future training epoch, the processor circuitry 130 dynamically alters the value of one or more of the shared exponent 154, one or more FP16 mantissa values $208_1$-$208_n$, and one or more FP16 exponent values $206_1$-$206_n$ to minimize or eliminate the possibility of an overflow or underflow condition. The method 600 concludes at 608.

Figure 7:
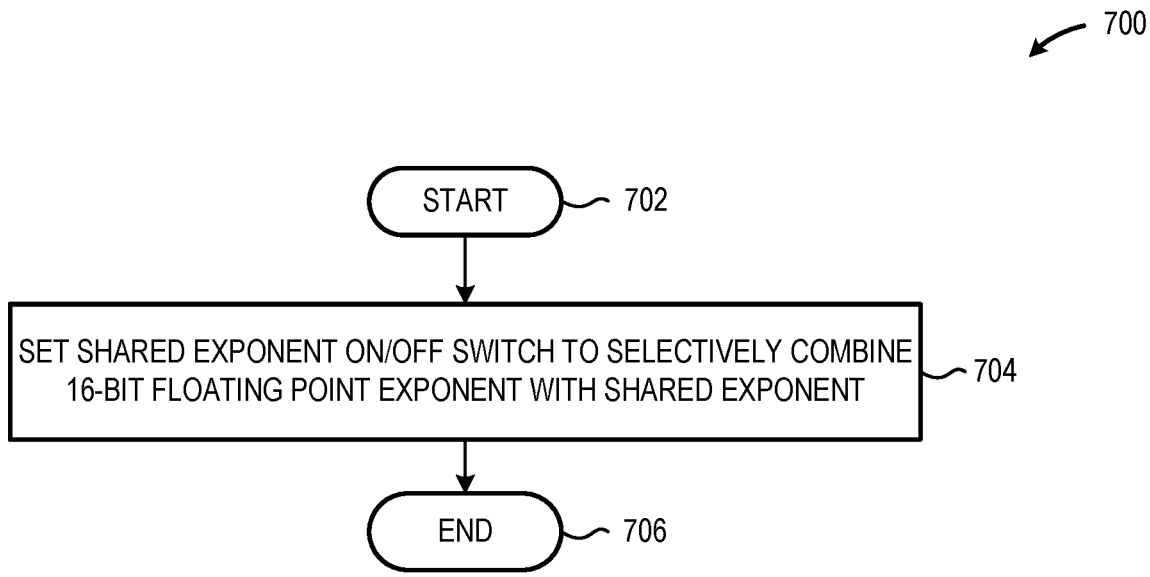
FIG. 7 is a high-level flow diagram of an illustrative method of generating 16-bit floating point values having a variable bit-length mantissa; a variable bit-length exponent; and a shared exponent, responsive to detecting data indicative of a potential overflow or underflow condition, in accordance with at least one embodiment described herein.

FIG. 7 is a high-level flow diagram of an illustrative method 700 of selectively combining the exponent portion of a variable bit-length exponent included in a 16-bit floating point value 152 with a shared exponent value based on a logical state of a shared exponent switch $302_1$-$302_n$ bit included in each of the FP16 numbers $152_1$-$152_n$ included in the training tensor 300, in accordance with at least one embodiment described herein. In embodiments, each of the 16-bit floating point values $152_1$-$152_n$ may include a respective sign bit $204_1$-$204_n$, a respective shared exponent ON/OFF switch bit $302_1$-$302_n$, a respective 6-bit mantissa $208_1$-$208_n$, and a respective 8-bit exponent $208_1$-$208_n$. The method 700 beneficially permits the use of multiple different exponent values for each of the FP16 numbers $152_1$-$152_n$ included in the training tensor 150. The method 700 commences at 702.

At 704, the processor circuitry 130 selectively and individually sets the shared exponent switch bit $302_1$-$302_n$ for each one of the FP16 numbers $152_1$-$152_n$ included in the training tensor 150. In embodiments, the processor circuitry 130 may selectively set the shared exponent switch bit 304 based on a determination that the exponent value $206_1$-$206_n$ of an FP16 number $152_1$-$152_n$ included in the training tensor 150 is insufficient to prevent a future overflow or underflow of the respective FP16 number $152_1$-$152_n$. By combining the exponent bits included in the 16-bit floating point value 152 with the shared exponent associated with the training tensor 150, the processor circuitry 130 minimizes or eliminates the likelihood of an overflow or underflow condition. The method 700 concludes at 706.

Figure 8:
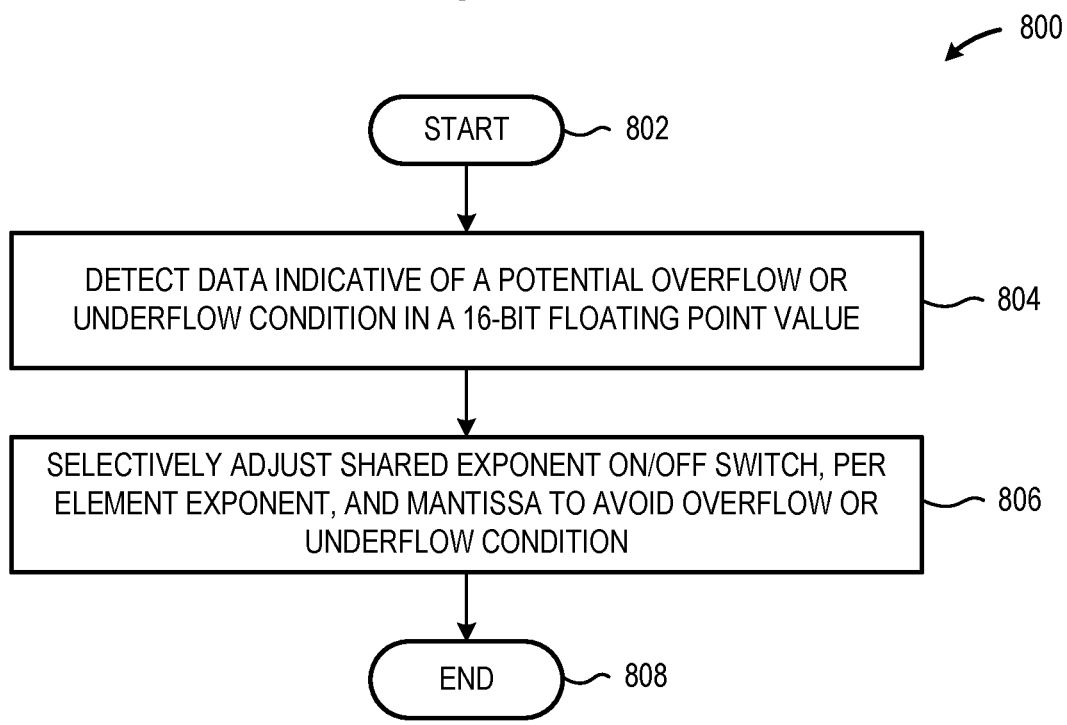
FIG. 8 is a high-level flow diagram of an illustrative method of selectively combining the exponent portion of a variable bit-length exponent included in a 16-bit floating point value with a shared exponent value based on a logical state of a shared exponent switch bit included in the 16-bit floating point value, in accordance with at least one embodiment described herein.

FIG. 8 is a high-level flow diagram of an illustrative method 800 of selectively adjusting the value of one or more of the shared exponent 154, one or more FP16 mantissa values $208_1$-$208_n$, and one or more FP16 exponent values $206_1$-$206_n$, and/or selectively controlling whether individual exponent values $206_1$-$206_n$ for each FP 16 number $152_1$-$152_n$ are combined with the shared exponent 154 responsive to detecting data indicative of a potential overflow or underflow condition, in accordance with at least one embodiment described herein. The method 800 commences at 802.

At 804, the processor circuitry 130 detects data indicative of a potential overflow or underflow condition in one or more of the 16-bit floating point values $152_1$-$152_n$ included in the training tensor 150. In embodiments, the processor circuitry 130 may include predictive circuitry and/or comparator circuitry capable of predicting a 16-bit floating point value 152 during future training epochs.

At 806, responsive to a determination that one or more of the 16-bit floating point values 152 will overflow or underflow during a future training epoch, the processor circuitry 130 dynamically alters the value of one or more of the shared exponent 154, one or more FP16 mantissa values $208_1$-$208_n$, one or more FP16 exponent values $206_1$-$206_n$, and/or sets the shared exponent ON/OFF switch $302_1$-$302_n$ to a desired logical state to minimize or eliminate the possibility of an overflow or underflow condition. The method 800 concludes at 808.

While FIGS. 5 through 8 illustrate various operations according to one or more embodiments, it is to be understood that not all of the operations depicted in FIGS. 5 through 8 are necessary for other embodiments. Indeed, it is fully contemplated herein that in other embodiments of the present disclosure, the operations depicted in FIGS. 5 through 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD- ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for training neural networks using a tensor that includes a plurality of 16-bit floating point values and a plurality of bits that define an exponent shared by some or all of the 16-bit floating point values included in the tensor. The 16-bit floating point values may include IEEE 754 format 16-bit floating point values and the tensor may include a plurality of bits defining the shared exponent. The tensor may include a shared exponent and 16-bit floating point values that include a variable bit-length mantissa and a variable bit-length exponent that may be dynamically set by processor circuitry. The tensor may include a shared exponent and 16-bit floating point values that include a variable bit-length mantissa; a variable bit-length exponent that may be dynamically set by processor circuitry; and a shared exponent switch set by the processor circuitry to selectively combine the 16-bit floating point value exponent with the shared exponent.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for forming magnetically lined through-holes in a semiconductor package substrate.

According to example 1, there is provided a system for training a neural network. The system may include: processor circuitry; and a storage device coupled to the processor circuitry, the storage device including machine readable instructions. The machine-readable instructions cause the processor circuitry to: generate a neural network training tensor that includes: a plurality of 16-bit floating point values, each of the plurality of 16-bit floating point values including: a first plurality of bits that form a mantissa of the respective floating point number; and a second plurality of bits that form an exponent of the respective floating point number; and a five-bit shared exponent common to each of the 16-bit floating point values included in the training tensor.

Example 2 may include elements of example 1 where each of the plurality of 16-bit floating point values included in the neural network training tensor includes: a ten bit mantissa provided by the first plurality of bits; a five bit exponent provided by the second plurality of bits; and a one-bit sign.

Example 3 may include elements of any of examples 1 or 2 where each of the plurality of 16-bit floating point values included in the neural network training tensor may include: a variable bit-length mantissa provided by the first plurality of bits; a variable bit-length exponent provided by the second plurality of bits; and a one-bit sign; where the instructions further cause the processor circuitry to select, based on one or more neural network parameters: a number of bits to represent the variable bit-length mantissa; and a number of bits to represent the variable bit-length exponent.

Example 4 may include elements of any of examples 1 through 3 where the one or more neural network parameters may include data representative of a trend indicative of at least one of: an underflow condition or an overflow condition in one or more of the 16-bit floating point values included in the network training tensor.

Example 5 may include elements of any of examples 1 through 4 where each of the plurality of 16-bit floating point values included in the neural network training tensor may include: the mantissa provided by the first plurality of bits; the exponent provided by the second plurality of bits; a one-bit sign; and a one-bit switch to selectively combine the exponent portion of the respective 16-bit floating point number with the shared exponent.

According to example 6, there is provided a neural network training method. The neural network training method may include: generating, by processor circuitry, a neural network training tensor that includes: a plurality of 16-bit floating point values, each of the 16-bit floating point values including: a first plurality of bits that form a mantissa of the respective floating point number; and a second plurality of bits that form an exponent of the respective floating point number; and a five-bit shared exponent common to each of the 16-bit floating point values included in the training tensor; and providing as an input to the neural network at least one of the plurality of 16-bit floating point values included in the training tensor.

Example 7 may include elements of example 6 where generating the neural network training tensor may include: generating the neural network training tensor that includes the plurality of 16-bit floating point values and the five-bit shared exponent, wherein each of the plurality of 16-bit floating point values includes: a ten bit mantissa provided by the first plurality of bits; a five bit exponent provided by the second plurality of bits; and a one-bit sign.

Example 8 may include elements of any of examples 6 or 7 where generating the neural network training tensor may include: generating the neural network training tensor that includes the plurality of 16-bit floating point values and the five-bit shared exponent, wherein each of the plurality of 16-bit floating point values includes: a variable bit-length mantissa provided by the first plurality of bits; a variable bit-length exponent provided by the second plurality of bits; and a one-bit sign.

Example 9 may include elements of any of examples 6 through 8 and the method may additionally include selecting, by the processor circuitry based on one or more neural network parameters: a first number of bits to represent the variable bit-length mantissa; and a second number of bits to represent the variable bit-length exponent.

Example 10 may include elements of any of examples 6 through 9 and the method may additionally include detecting, by the processor circuitry, a trend in one or more of the plurality of 16-bit floating point values included in the training tensor, the detected trend indicative of at least one of: an underflow condition or an overflow condition in one or more of the 16-bit floating point values included in the network training tensor.

Example 11 may include elements of any of examples 6 through 10 where selecting a first number of bits to represent the variable bit-length mantissa; and a second number of bits to represent the variable bit-length exponent may include: selecting, by the processor circuitry, a first number of bits included in the first plurality of bits and a second number of bits included in the second plurality of bits responsive to detecting the trend indicative of at least one of: an underflow condition or an overflow condition in one or more of the 16-bit floating point values included in the network training tensor.

Example 12 may include elements of any of examples 6 through 11 where generating the neural network training tensor may include: generating the neural network training tensor that includes the plurality of 16-bit floating point values and the five-bit shared exponent, wherein each of the plurality of 16-bit floating point values includes: the mantissa provided by the first plurality of bits; the exponent provided by the second plurality of bits; a one-bit sign; and a one-bit switch to selectively combine the exponent portion of the respective 16-bit floating point number with the shared exponent.

According to example 13, there is provided a neural network training system. The training system may include: means for generating, by processor circuitry, a neural network training tensor that includes: a plurality of 16-bit floating point values, each of the 16-bit floating point values including: a first plurality of bits that form a mantissa of the respective floating point number; and a second plurality of bits that form an exponent of the respective floating point number; and a five-bit shared exponent common to each of the 16-bit floating point values included in the training tensor; and means for providing as an input to the neural network at least one of the plurality of 16-bit floating point values included in the training tensor.

Example 14 may include elements of example 13 where the means for generating the neural network training tensor may include: means for generating the neural network training tensor that includes the plurality of 16-bit floating point values and the five-bit shared exponent, wherein each of the plurality of 16-bit floating point values includes: a ten bit mantissa provided by the first plurality of bits; a five bit exponent provided by the second plurality of bits; and a one-bit sign.

Example 15 may include elements of any of examples 13 or 14 where the means for generating the neural network training tensor may further include: means for generating the neural network training tensor that includes the plurality of 16-bit floating point values and the five-bit shared exponent, wherein each of the plurality of 16-bit floating point values includes: a variable bit-length mantissa provided by the first plurality of bits; a variable bit-length exponent provided by the second plurality of bits; and a one-bit sign.

Example 16 may include elements of any of examples 13 through 15 and the system may further include: means for selecting: a first number of bits to represent the variable bit-length mantissa; and a second number of bits to represent the variable bit-length exponent.

Example 17 may include elements of any of examples 13 through 16 and the system may further include: means for detecting a trend in one or more of the plurality of 16-bit floating point values included in the training tensor, the detected trend indicative of at least one of: a potential underflow condition or a potential overflow condition in one or more of the 16-bit floating point values included in the neural network training tensor.

Example 18 may include elements of any of examples 13 through 17 where the means for selecting a first number of bits to represent the variable bit-length mantissa; and a second number of bits to represent the variable bit-length exponent may further include: means for selecting a first number of bits included in the first plurality of bits and a second number of bits included in the second plurality of bits responsive to detecting the trend indicative of at least one of: an underflow condition or an overflow condition in one or more of the 16-bit floating point values included in the network training tensor.

Example 19 may include elements of any of examples 13 through 18 where the means for generating the neural network training tensor may further include: means for generating the neural network training tensor that includes the plurality of 16-bit floating point values and the five-bit shared exponent, wherein each of the plurality of 16-bit floating point values includes: the mantissa provided by the first plurality of bits; the exponent provided by the second plurality of bits; a one-bit sign; and a one-bit switch to selectively combine the exponent portion of the respective 16-bit floating point number with the shared exponent.

According to example 20, there is provided a non-transitory, computer-readable, storage medium that includes machine readable instructions that, when executed by processor circuitry, cause the processor circuitry to: generate a neural network training tensor that includes: a plurality of 16-bit floating point values, each of the plurality of 16-bit floating point values including: a first plurality of bits that form a mantissa of the respective floating point number; and a second plurality of bits that form an exponent of the respective floating point number; and a five-bit shared exponent common to each of the 16-bit floating point values included in the training tensor.

Example 21 may include elements of example 20 where the machine readable instructions that cause the processor circuitry to generate neural network training tensor that includes a plurality of 16-bit floating point values further cause the processor circuitry to: generate a neural network training tensor that includes a plurality of 16-bit floating point values, each of the plurality of 16-bit floating point values including: a ten bit mantissa provided by the first plurality of bits; a five bit exponent provided by the second plurality of bits; and a one-bit sign.

Example 22 may include elements of examples 20 or 21 where the machine readable instructions that cause the processor circuitry to generate neural network training tensor that includes a plurality of 16-bit floating point values further cause the processor circuitry to: generate a neural network training tensor that includes a plurality of 16-bit floating point values, each of the plurality of 16-bit floating point values including: a variable bit-length mantissa provided by the first plurality of bits; a variable bit-length exponent provided by the second plurality of bits; and a one-bit sign; and select, based on one or more neural network parameters: a number of bits to represent the variable bit-length mantissa; and a number of bits to represent the variable bit-length exponent.

Example 23 may include elements of any of examples 20 through 22 where the machine readable instructions that cause the processor circuitry to select a number of bits to represent the variable bit-length mantissa and the variable bit-length exponent based on one or more neural network parameters further cause the processor circuitry to: select a number of bits to represent the variable bit-length mantissa and the variable bit-length exponent based on one or more of: an underflow condition or an overflow condition in one or more of the 16-bit floating point values included in the network training tensor.

Example 24 may include elements of any of examples 20 through 23 where the machine readable instructions that cause the processor circuitry to generate neural network training tensor that includes a plurality of 16-bit floating point values further cause the processor circuitry to: generate a neural network training tensor that includes a plurality of 16-bit floating point values, each of the plurality of 16-bit floating point values including: the mantissa provided by the first plurality of bits; the exponent provided by the second plurality of bits; a one-bit sign; and a one-bit switch to selectively combine the exponent portion of the respective 16-bit floating point number with the shared exponent.

According to example 25, there is provided a processor-based device. The processor-based device may include: a printed circuit board; processor circuitry coupled to the printed circuit board; an input/output interface couplable to a neural network; and a storage device coupled to the processor circuitry, the storage device including machine readable instructions that, when executed by the processor circuitry, cause the processor circuitry to: generate a neural network training tensor that includes: a plurality of 16-bit floating point values, each of the plurality of 16-bit floating point values including: a first plurality of bits that form a mantissa of the respective floating point number; and a second plurality of bits that form an exponent of the respective floating point number; and a five-bit shared exponent common to each of the 16-bit floating point values included in the training tensor.

Example 26 may include elements of example 25 where each of the plurality of 16-bit floating point values included in the neural network training tensor comprises: a ten bit mantissa provided by the first plurality of bits; a five bit exponent provided by the second plurality of bits; and a one-bit sign.

Example 27 may include elements of any of examples 25 or 26 where each of the plurality of 16-bit floating point values included in the neural network training tensor may include: a variable bit-length mantissa provided by the first plurality of bits; a variable bit-length exponent provided by the second plurality of bits; and a one-bit sign; wherein the instructions further cause the processor circuitry to select, based on one or more neural network parameters: a number of bits to represent the variable bit-length mantissa; and a number of bits to represent the variable bit-length exponent.

Example 28 may include elements of any of examples 25 through 27 where the one or more neural network parameters comprise a trend indicative of at least one of: an underflow condition or an overflow condition in one or more of the 16-bit floating point values included in the network training tensor.

Example 29 may include elements of any of examples 25 through 28 where each of the plurality of 16-bit floating point values included in the neural network training tensor comprises: the mantissa provided by the first plurality of bits; the exponent provided by the second plurality of bits; a one-bit sign; and a one-bit switch to selectively combine the exponent portion of the respective 16-bit floating point number with the shared exponent.

According to example 30, there is provided a tensor data structure. The tensor data structure may include: a plurality of 16-bit floating point registers, each of the plurality of 16-bit floating point registers including: a first plurality of bits corresponding to a mantissa value; a second plurality of bits corresponding to an exponent value; and a sign bit; and a shared exponent register, the shared exponent register associated with each respective one of the plurality of 16-bit floating point registers.

Example 31 may include elements of example 30 where each of the plurality of 16-bit floating point registers includes: a ten bit mantissa provided by the first plurality of bits; a five bit exponent provided by the second plurality of bits; and a one-bit sign.

Example 32 may include elements of any of examples 30 or 31 where each of the plurality of 16-bit floating point registers includes: a variable bit-length mantissa provided by the first plurality of bits; a variable bit-length exponent provided by the second plurality of bits; and a one-bit sign.

Example 33 may include elements of any of examples 30 through 32 where each of the plurality of 16-bit floating point registers includes: the mantissa provided by the first plurality of bits; the exponent provided by the second plurality of bits; a one-bit sign; and a one-bit switch to selectively combine the exponent portion of the respective 16-bit floating point number with the shared exponent.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A system for training a neural network, comprising:
    processor circuitry;
    a communications interface coupled to the processor circuitry, the communications interface couplable to the neural network; and
    a storage device coupled to the processor circuitry, the storage device including machine readable instructions that, when executed by the processor circuitry, cause the processor circuitry to:
    generate a neural network training tensor that includes:
        a five-bit shared exponent stored in a memory, the five-bit shared exponent common to each of a plurality of 16-bit floating point values included in the neural network training tensor, each of the plurality of 16-bit floating point values including:
            a first plurality of bits stored in the memory, the first plurality of bits to form a mantissa of the respective floating point value;

a second plurality of bits stored in the memory, the second plurality of bits to form an exponent portion of the respective floating point value; and a one-bit switch stored in the memory, the one-bit switch to selectively combine the exponent portion of the respective 16-bit floating point value with the five-bit shared exponent; and adjust, in response to prediction of an overflow condition or an underflow condition during training of the neural network, one or more of the 16-bit floating point values in the memory to avoid the predicted overflow or underflow.

2. The system of claim 1, wherein each of the plurality of 16-bit floating point values included in the neural network training tensor includes:

a six bit mantissa provided by the first plurality of bits;
an eight bit exponent provided by the second plurality of bits; and
a one-bit sign.

3. The system of claim 1, wherein the mantissa is a variable bit-length mantissa, the exponent portion is a variable bit-length exponent, and wherein the instructions further cause the processor circuitry to select, based on one or more neural network parameters:

a first number of bits to represent the variable bit-length mantissa; and
a second number of bits to represent the variable bit-length exponent.

4. The system of claim 3, wherein the one or more neural network parameters include a trend indicative of at least one of: an underflow condition or an overflow condition in one or more of the 16-bit floating point values included in the neural network training tensor.

5. The system of claim 1, wherein each of the plurality of 16-bit floating point values included in the neural network training tensor includes:

the mantissa provided by the first plurality of bits;
the exponent portion provided by the second plurality of bits; and
a one-bit sign.

6. A method of training a neural network, comprising:
generating, by processor circuitry, a neural network training tensor that includes:
a five-bit shared exponent stored in a memory, the five-bit shared exponent common to each of a plurality of 16-bit floating point values included in the neural network training tensor, each of the 16-bit floating point values including:
a first plurality of bits stored in the memory, the first plurality of bits to form a mantissa of the respective floating point value; and
a second plurality of bits stored in the memory, the second plurality of bits form an exponent portion of the respective floating point value; and
a one-bit switch stored in the memory, the one-bit switch to selectively combine the exponent portion of the respective 16-bit floating point value with the five-bit shared exponent;

adjusting, by the processor circuitry in response to prediction of an overflow condition or an underflow condition during training of the neural network, one or more of the 16-bit floating point values in the memory to avoid the predicted overflow or underflow; and providing, by the processor circuitry, at least one of the plurality of 16-bit floating point values included in the neural network training tensor as an input to the neural network.

7. The method of claim 6, wherein the generating of the neural network training tensor includes:
generating the neural network training tensor that includes the plurality of 16-bit floating point values and the five-bit shared exponent, wherein each of the plurality of 16-bit floating point values includes:
a six bit mantissa provided by the first plurality of bits;
an eight bit exponent provided by the second plurality of bits; and
a one-bit sign.

8. The method of claim 6, wherein the generating of the neural network training tensor includes:
generating the neural network training tensor that includes the plurality of 16-bit floating point values and the five-bit shared exponent, wherein each of the plurality of 16-bit floating point values includes:
a variable bit-length mantissa provided by the first plurality of bits;
a variable bit-length exponent provided by the second plurality of bits; and
a one-bit sign.

9. The method of claim 8, further including selecting, by the processor circuitry based on one or more neural network parameters:
a first number of bits to represent the variable bit-length mantissa; and
a second number of bits to represent the variable bit-length exponent.

10. The method of claim 9, further including:
detecting, by the processor circuitry, a trend in one or more of the plurality of 16-bit floating point values included in the training tensor, the detected trend indicative of at least one of: an underflow condition or an overflow condition in one or more of the 16-bit floating point values included in the neural network training tensor.

11. The method of claim 9, wherein the selecting of the first number of bits to represent the variable bit-length mantissa and the second number of bits to represent the variable bit-length exponent includes:
selecting, by the processor circuitry, a first number of bits included in the first plurality of bits and a second number of bits included in the second plurality of bits responsive to detecting a trend indicative of at least one of: an underflow condition or an overflow condition in one or more of the 16-bit floating point values included in the neural network training tensor.

12. The method of claim 6, wherein the generating of the neural network training tensor includes:
generating the neural network training tensor that includes the plurality of 16-bit floating point values and the five-bit shared exponent, wherein each of the plurality of 16-bit floating point values includes:
the mantissa provided by the first plurality of bits;
the exponent portion provided by the second plurality of bits; and
a one-bit sign.

13. A neural network training system, comprising:
means for generating a neural network training tensor that includes:
a five-bit shared exponent stored in a memory, the five-bit shared exponent common to each of a plurality of 16-bit floating point values included in the neural network training tensor, each of the 16-bit floating point values including:

a first plurality of bits stored in the memory, the first plurality of bits to form a mantissa of the respective floating point value;

a second plurality of bits stored in the memory, the second plurality of bits to form an exponent portion of the respective floating point value; and a one-bit switch stored in the memory, the one-bit switch to selectively combine the exponent portion of the respective 16-bit floating point value with the five-bit shared exponent;

means for adjusting, in response to prediction of an overflow condition or an underflow condition during training of a neural network, one or more of the 16-bit floating point values in the memory to avoid the predicted overflow or underflow; and means for providing as an input to the neural network at least one of the plurality of 16-bit floating point values included in the neural network training tensor.

14. The system of claim 13, wherein the means for generating the neural network training tensor includes:

means for generating the neural network training tensor that includes the plurality of 16-bit floating point values and the five-bit shared exponent, wherein each of the plurality of 16-bit floating point values includes:
a six bit mantissa provided by the first plurality of bits;
an eight bit exponent provided by the second plurality of bits; and
a one-bit sign.

15. The system of claim 13, wherein the means for generating the neural network training tensor further includes:

means for generating the neural network training tensor that includes the plurality of 16-bit floating point values and the five-bit shared exponent, wherein each of the plurality of 16-bit floating point values includes:
a variable bit-length mantissa provided by the first plurality of bits;
a variable bit-length exponent provided by the second plurality of bits; and
a one-bit sign.

16. The system of claim 15, further including means for selecting:
a first number of bits to represent the variable bit-length mantissa; and
a second number of bits to represent the variable bit-length exponent.

17. The system of claim 16, further including means for detecting a trend in one or more of the plurality of 16-bit floating point values included in the neural network training tensor, the detected trend indicative of at least one of: a potential underflow condition or a potential overflow condition in one or more of the 16-bit floating point values included in the neural network training tensor.

18. The system of claim 16, wherein the means for selecting a first number of bits to represent the variable bit-length mantissa and a second number of bits to represent the variable bit-length exponent further includes means for selecting a first number of bits included in the first plurality of bits and a second number of bits included in the second plurality of bits responsive to detecting a trend indicative of at least one of: an underflow condition or an overflow condition in one or more of the 16-bit floating point values included in the neural network training tensor.

19. The system of claim 13, wherein the means for generating the neural network training tensor further includes means for generating the neural network training tensor that includes the plurality of 16-bit floating point values and the five-bit shared exponent, wherein each of the plurality of 16-bit floating point values includes:
the mantissa provided by the first plurality of bits;
the exponent portion provided by the second plurality of bits; and
a one-bit sign.

20. A non-transitory, computer-readable storage medium that includes machine readable instructions that, when executed by processor circuitry, cause the processor circuitry to:

generate a neural network training tensor that includes:
a five-bit shared exponent stored in a memory, the five-bit shared exponent common to each of a plurality of 16-bit floating point values included in the neural network training tensor, each of the plurality of 16-bit floating point values including:
a first plurality of bits stored in the memory, the first plurality of bits to form a mantissa of the respective floating point value;
a second plurality of bits stored in the memory, the second plurality of bits to form an exponent portion of the respective floating point value; and
a one-bit switch stored in the memory, the one-bit switch to selectively combine the exponent portion of the respective 16-bit floating point value with the five-bit shared exponent; and adjust, in response to a prediction of an overflow or underflow condition during training of a neural network, one or more of the 16-bit floating point values in the memory to avoid the predicted overflow or underflow.

21. The non-transitory, computer-readable storage medium of claim 20, wherein each of the plurality of 16-bit floating point values includes:
a six bit mantissa provided by the first plurality of bits;
an eight bit exponent provided by the second plurality of bits; and
a one-bit sign.

22. The non-transitory, computer-readable storage medium of claim 20, wherein the mantissa is a variable bit-length mantissa, the exponent portion is a variable bit-length exponent, and wherein the instructions, when executed, cause the processor circuitry to select, based on one or more neural network parameters:
a first number of bits to represent the variable bit-length mantissa; and
a second number of bits to represent the variable bit-length exponent.

23. The non-transitory, computer-readable storage medium of claim 22, wherein the one or more neural network parameters indicate an underflow condition or an overflow condition in one or more of the plurality of 16-bit floating point values included in the neural network training tensor.

24. The non-transitory, computer-readable storage medium of claim 20, wherein the machine readable instructions that cause the processor circuitry to generate the neural network training tensor that includes a plurality of 16-bit floating point values further cause the processor circuitry to:
generate a neural network training tensor that includes a plurality of 16-bit floating point values, each of the plurality of 16-bit floating point values including:
the mantissa provided by the first plurality of bits;
the exponent portion provided by the second plurality of bits; and
a one-bit sign.

25. Processor circuitry programmed to implement a tensor data storage structure in a plurality of hardware registers, comprising:
- a five-bit shared hardware register to store a first exponent value, the five-bit shared hardware register associated with each respective one of a plurality of 16-bit floating point hardware registers, each of the plurality of 16-bit floating point hardware registers including:
  - a first hardware register to store a mantissa value;
  - a second hardware register to store a second exponent value;
  - a third hardware register to store a sign bit; and
  - a one-bit switch hardware register to selectively combine each respective 16-bit floating point hardware register with the five-bit shared exponent hardware register; and
- predictive circuitry to adjust one or more of the 16-bit floating point hardware registers in response to a prediction of an overflow or underflow condition in one or more of the 16-bit floating point hardware registers to avoid the overflow or underflow.

* * * * *